United States Patent [19]

Fukunaga et al.

[11] Patent Number: 4,631,382
[45] Date of Patent: Dec. 23, 1986

[54] BED FOR ELECTRICAL DISCHARGE MACHINING APPARATUS

[75] Inventors: Tokio Fukunaga; Takuji Magara; Shigekazu Sakabe, all of Hyogo; Jun Aramaki, Aichi; Toshiharu Karashima, Aichi; Minoru Ushida, Aichi, all of Japan

[73] Assignee: Mitsubishi Denki Kabushiki Kaisha, Tokyo, Japan

[21] Appl. No.: 651,568

[22] Filed: Sep. 18, 1984

[30] Foreign Application Priority Data

| Sep. 19, 1983 [JP] | Japan | 58-172514 |
|---|---|---|
| Sep. 19, 1983 [JP] | Japan | 58-172515 |
| Sep. 19, 1983 [JP] | Japan | 58-172517 |

[51] Int. Cl.$^4$ .......... B23H 1/00; B23H 7/32; A47B 7/02
[52] U.S. Cl. .................. 219/69 R; 108/102; 108/143; 219/69 G; 219/69 V
[58] Field of Search ............. 219/69 M, 69 R, 69 E, 219/69 G, 69 V; 160/193, 201, 202, 214; 308/3.5, 3.8, 6 R, 3 R; 108/102, 143, 151, 35, 53.11, 53.3; 248/429, 678; 269/289 R, 309; 384/7

[56] References Cited

U.S. PATENT DOCUMENTS

| 2,159,247 | 5/1939 | Boom | 248/678 |
|---|---|---|---|
| 2,190,213 | 2/1940 | Meyer | 308/3.5 |
| 2,598,938 | 6/1952 | Philippe | 308/6 R |
| 3,469,058 | 9/1969 | O'Connor | 308/3 R |
| 3,562,474 | 2/1971 | Sellmann | 219/69 V |
| 3,751,120 | 8/1973 | Kretz | 160/202 |
| 3,772,494 | 11/1973 | O'Connor | 219/69 G |
| 3,897,119 | 7/1975 | McMurtrie | 308/6 R |
| 4,075,897 | 2/1978 | Schmidt | 219/69 V |
| 4,163,887 | 8/1979 | Bühler et al. | 219/69 W |
| 4,177,550 | 12/1979 | Sipek et al. | 248/678 |
| 4,262,974 | 4/1981 | Tojo et al. | 308/6 R |
| 4,364,539 | 12/1982 | Drysdale | 248/678 |
| 4,409,860 | 10/1983 | Moriyama et al. | 108/143 |
| 4,518,155 | 5/1985 | Lehmann | 269/309 |
| 4,547,646 | 10/1985 | Briffod | 219/69 M |
| 4,553,793 | 11/1985 | Teramachi | 308/6 R |

FOREIGN PATENT DOCUMENTS

| 26919 | 4/1981 | European Pat. Off. | 269/289 R |
|---|---|---|---|
| 2243313 | 3/1973 | Fed. Rep. of Germany | 269/309 |
| 3127584 | 7/1982 | Fed. Rep. of Germany | 219/69 E |
| 139408 | 1/1980 | German Democratic Rep. | 269/289 R |
| 53-13285 | 2/1978 | Japan | 269/309 |
| 1333702 | 10/1973 | United Kingdom | 308/3 R |

Primary Examiner—A. D. Pellinen
Assistant Examiner—Geoffrey S. Evans
Attorney, Agent, or Firm—Sughrue, Mion, Zinn, Macpeak & Seas

[57] ABSTRACT

An electrical discharge machining apparatus having an improved bed which provides improved control over the gap between a machining head and a workpiece by reducing the amount of deformation produced in the bed when the table and saddle are moved. The bed is constituted by an upper plate and side plates, with saddle guide rails being disposed on the upper plate, a saddle movably mounted on the saddle guide rails, table guide rails mounted on the saddle, and a workpiece-supporting table movably mounted on the saddle guide rails. In accordance with one embodiment of the invention, the saddle guide rails are positioned at the edges of the upper plate, directly above the side plates of the bed. In another embodiment, reinforcing members are provided under the upper plate, extending parallel to and directly under respective ones of guide rails.

14 Claims, 16 Drawing Figures

BED FOR ELECTRICAL DISCHARGE MACHINING APPARATUS

BACKGROUND OF THE INVENTION

The present invention relates to a bed for an electrical discharge machining apparatus, and particularly to a bed which results in improved machining accuracy.

FIG. 1 depicts a conventional electrical discharge machining apparatus in which a column 2 supporting a machining head 8 is fixed to a machine bed 1. A pair of saddle guide rails 3, provided on the bed 1, movably support a saddle 4 thereon. A table 6 is movably mounted on a pair of table guide rails 5 on the saddle 4. A workpiece 7 can be selectively fixed to the table 6. The workpiece 7 can thus be selectively moved in the X-Y plane, while the head 8 can be selectively moved in the Z direction.

The internal structure of the bed 1 is shown in FIG. 2. The bed 1 has a central reinforcing rib 11 arranged perpendicularly to the saddle guide rails 3, that is, in the Y direction.

To machine the workpiece 7, it is necessary to maintain the gap between the head 8 and the workpiece 7 constant while the workpiece is moved in the X-Y plane. During this movement in the X-Y plane, the centers of gravity of the workpiece 7, the saddle 4 and the table 6 shift relative to one another. The reinforcing rib 11 is provided to prevent the surface of the bed 1 from being deformed due to this shifting phenomenon, to thereby maintain the gap between the head 8 and the workpiece 7 constant. However, when the saddle 4 passes over the reinforcing rib 11, still some deformation, represented by $\delta_1$ in FIG. 3, unavoidably occurs. This results in an inaccuracy in the gap between the head 8 and the workpiece 7, thereby limiting the accuracy of the machining operation.

SUMMARY OF THE INVENTION

Accordingly, it is an object of the present invention to provide a bed for an electrical discharge machining apparatus in which the disadvantages of the conventional bed described above have been eliminated. It is a further object of the invention to provide a bed for an electrical discharge machining apparatus, the use of which improves machining accuracy.

It is a still further object of the present invention to provide a bed for an electrical discharge machining apparatus in which the amount of deformation produced when the table and saddle are moved during a machining operation is substantially reduced.

These, as well as other objects of the invention, are provided by a bed for an electrical discharge machining apparatus having an upper plate carrying a pair of saddle rails and a pair of opposed side plates fixed to the upper plate, wherein the saddle rails are disposed parallel to the side plates and either directly supported on the upper ends of the side plates or on parallel reinforcing members.

DESCRIPTION OF THE PREFERRED EMBODIMENTS

Figure 1:
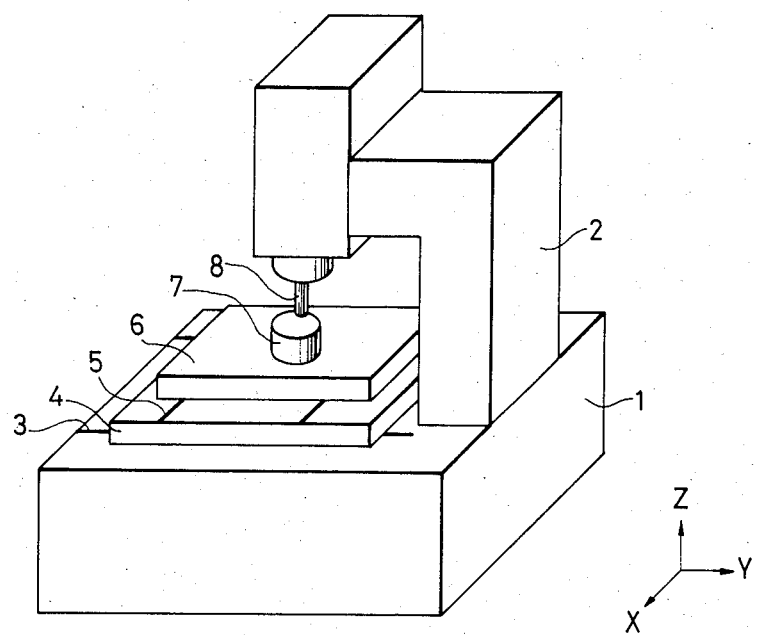
FIG. 1 is a perspective view of an example of a conventional electrical discharge machining apparatus.
Figure 2:
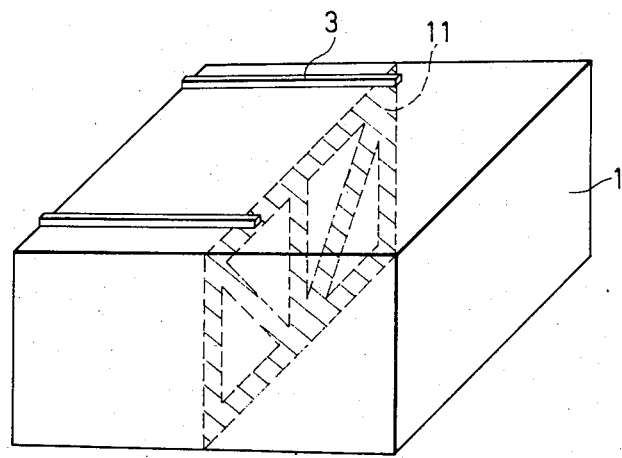
FIG. 2 is a perspective view showing the reinforcing structure of the conventional electrical discharge machining apparatus.
Figure 3:
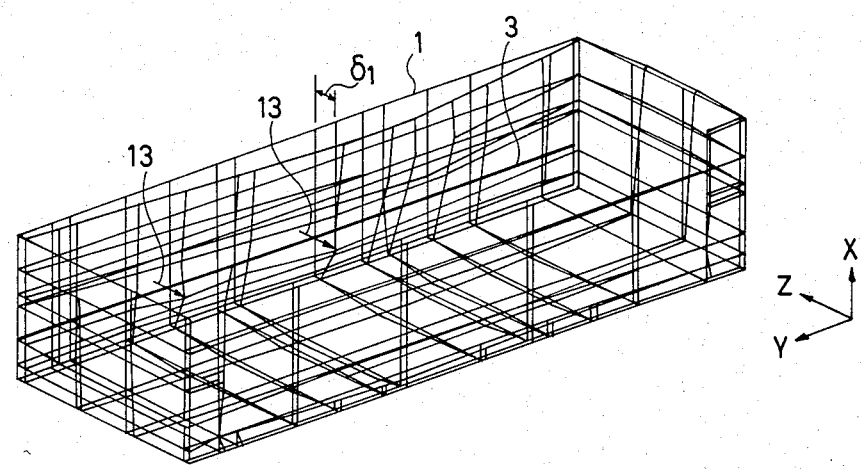
FIG. 3 is an analytical diagram showing the displacement of the center of gravity due to the displacement of the workpiece in the conventional electrical discharge machining apparatus.

Referring to the drawings, preferred embodiments of the invention will now be described.

Figure 4:
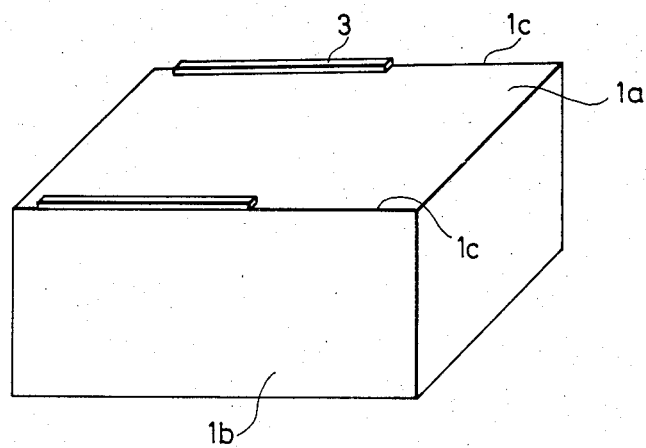
FIG. 4 is a perspective view showing a preferred embodiment of an electrical discharge machining apparatus of the invention.

In the embodiment shown in FIG. 4, a box-like bed 1 has an upper plate 1a and side plates 1b and 1c extending downwardly from the upper plate 1a. A pair of saddle guide rails 3 on which a saddle (not shown in this figure) is movably mounted are provided on the upper plate 1a. The sides of the saddle guide rails 3, in accordance with the invention, are positioned flush with the edges of the side plates 1b and 1c, that is, flush with the edges of the side plates 1b and 1c where the side plates 1b and 1c meet the upper plate 1a.

Figure 5:
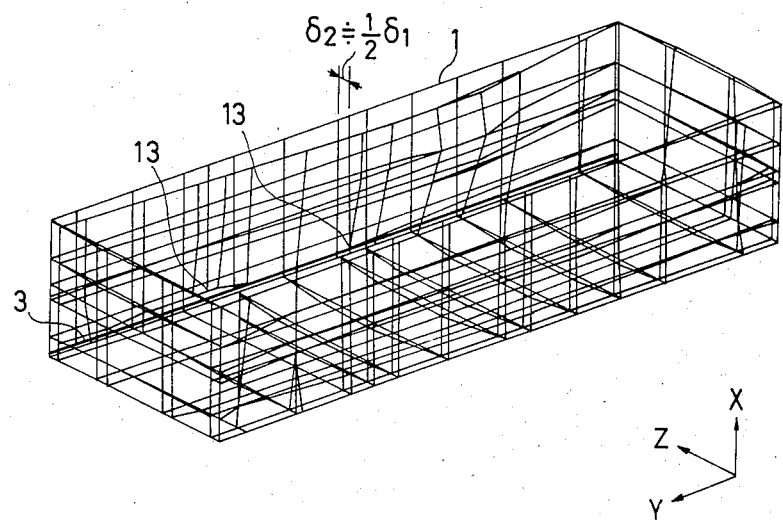
FIG. 5 is an analytical diagram showing bed deformation in the bed of FIG. 4.

Accordingly, even if the side plates 1b and 1c are rather thin and thus have low rigidity out of plane, since the load transmitted from the guide rails 3 is imposed entirely in the plane of the side plates 1b and 1c, the guide rails 3 are firmly supported in the vertical direction, and hence the rigidity of the bed is remarkably improved with the invention. Moreover, because the guide rails 3 are supported uniformly along their lengths, the deformation of the bed does not change when the load is shifted from one point on the upper plate 1a to another. As shown by the analytical diagram of FIG. 5, it has been experimentally proven that, for beds of similar dimensions and bearing like loads, the amount of deformation $\delta_2$ occurring for the bed of the invention is about half that $\delta_1$ in the base of the conventional bed.

Figure 6:
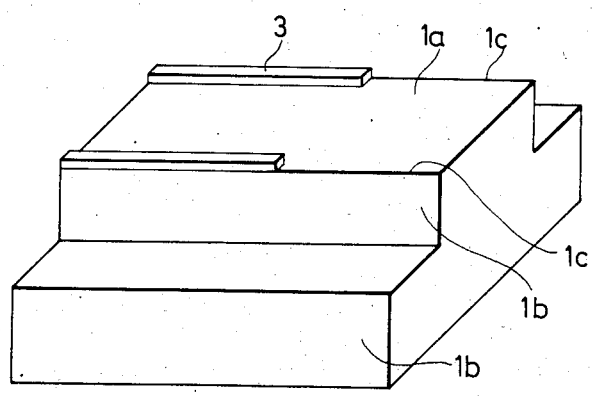
FIGS. 6 and 7 are perspective views showing other embodiment of the present invention.

In the embodiment of FIG. 6, the upper plate 1a takes the form of a central pedestal. The saddle guide rails 3 are disposed along the edges of the upper plate 1a, directly above the side plates 1b and 1c, as in the case of the first-described embodiment. Essentially the same effects as in the first-described embodiment are obtained.

Figure 7:
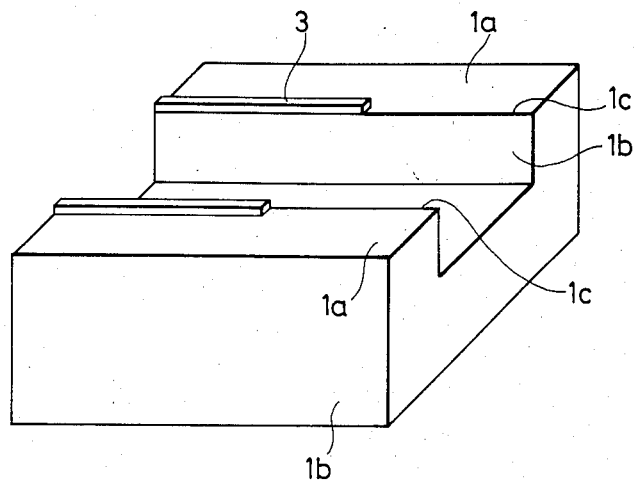

FIG. 7 shows another embodiment of the invention in which the upper plate 1a is divided into two parts, each supported laterally by respective pairs of side plates 1b and 1c. A valley portion is formed between the two parts of the upper plate 1a. The saddle guide rails 3 are mounted on the inner edges of the corresponding upper plate 1a above the inner ones of the side plates 1b and 1c. The same advantageous effects as before are obtained.

In each of the three embodiments described above, the saddle guide rails 3 are disposed with their edges flush with the edges of the respective side plates 1b and 1c. However, the same effect can be obtained if there is a slight offset between the edges of the saddle guide rails 3 and the side plates. It is sufficient if some portion of the saddle guide rails 3 overlaps the end surfaces of the side plates 1b and 1c.

Figure 8:
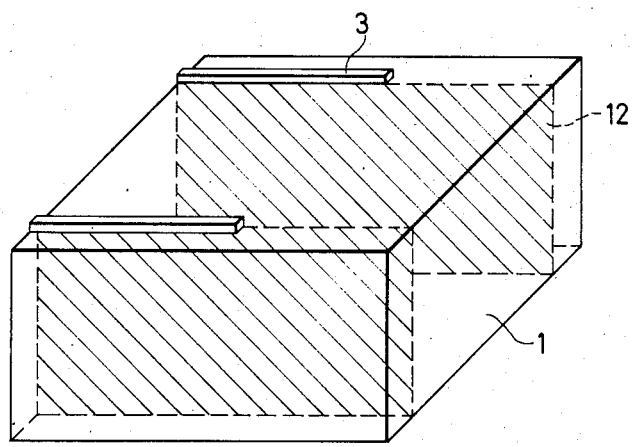
FIG. 8 is a diagram showing the arrangement of the reinforcing member of another embodiment of the present invention.
Figure 9:
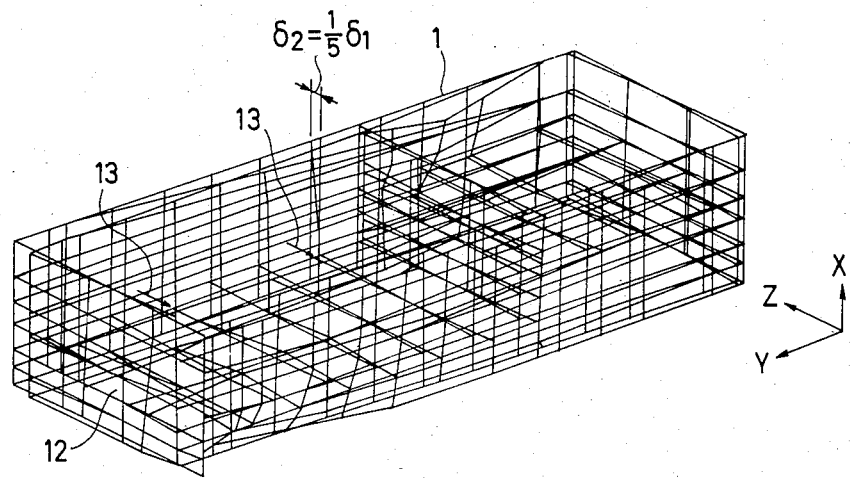
FIG. 9 is an analytical diagram showing bed deformation in the embodiment of FIG. 8.

Referring now to FIG. 8, a still further embodiment of the invention will be described. In this embodiment, the saddle guide rails 3 are located inwardly from the side plates of the bed 1 and reinforcing members 12 in the form of plates are provided directly under the respective saddle guide rails 3, extending parallel thereto. In this embodiment, the reinforcing plates, because they extend parallel rather than perpendicular to the saddle guide rails, provide a remarkable improvement in rigidity and provide uniform support along the entire length of the guide rails. That is, when the effective position of the load on the saddle guide rails 3 moves, there is no sudden change in rigidity at the center of the bed 1. As shown in the analytical diagram of FIG. 9, for beds of similar dimensions and equal loads, the amount of deformation $\delta_2$ for the embodiment of FIG. 8 is approximately one-fifth the amount of deformation $\delta_1$ for the conventional structure of FIG. 1.

Figure 10:
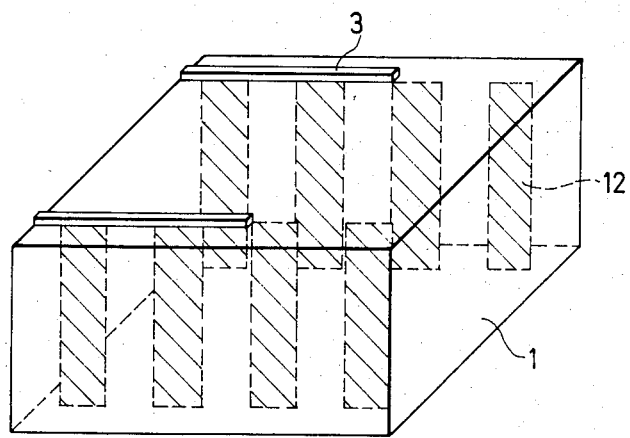
FIGS. 10, 11, 12 and 13 are diagrams showing the arrangement of the reinforcing member of a further embodiment of the present invention.

FIG. 10 shows a modification of the embodiment of FIG. 8 wherein the reinforcing members 12 are constituted by a plurality of longitudinally divided components. Essentially the same advantages are attained with this embodiment as well.

Figure 11:
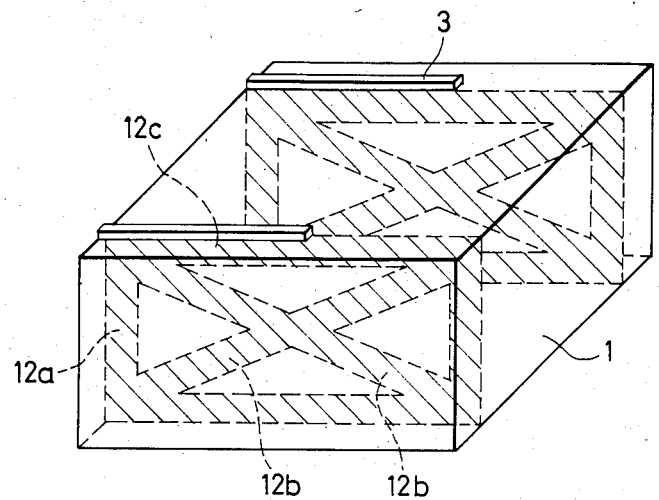

In the embodiment of FIG. 11, the reinforcing members 12 take the form of truss structures, that is, a frame constituted by vertical members 12a, transverse members 12c and bracing members 12b connecting the corners of the frame. Substantially uniform rigidity along the length of the saddle guide rails 3 is also achieved with this embodiment.

Figure 12:
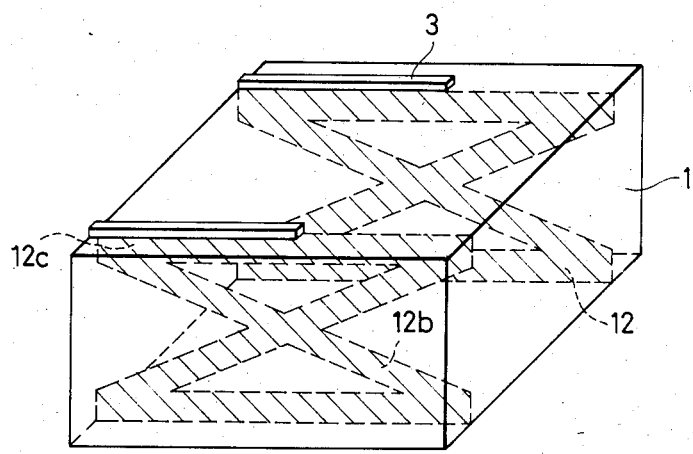
Figure 13:
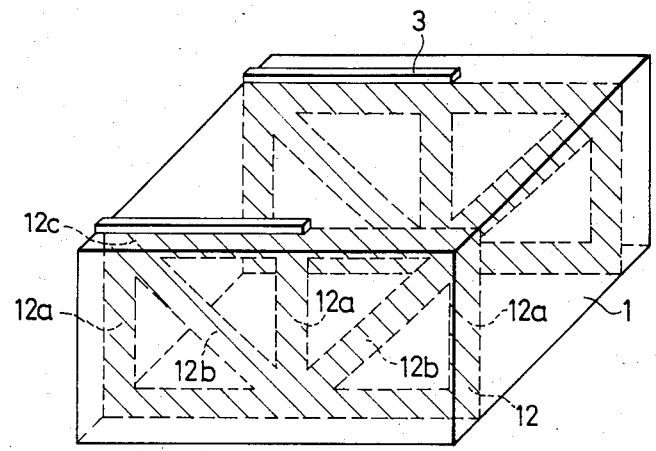

The embodiment of FIG. 12 is substantially similar to that of FIG. 11, except that the vertical members 12a have been omitted. In the FIG. 13 embodiment, bracing is provided by diagonal members 12b and a central vertical member 12a.

Figure 14:
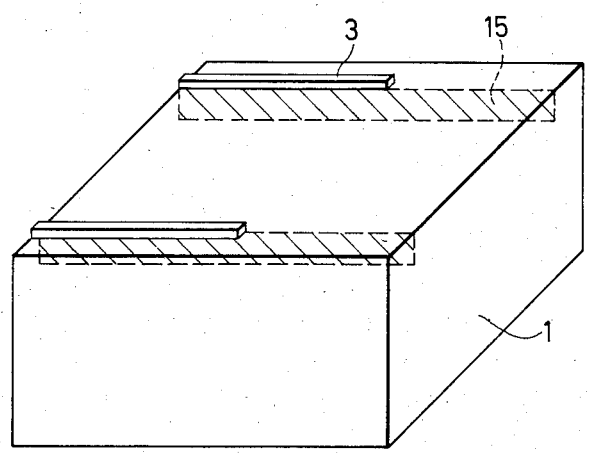
FIG. 14 is a diagram showing the arrangement of the reinforcing member of a still further embodiment of the present invention.
Figure 15:
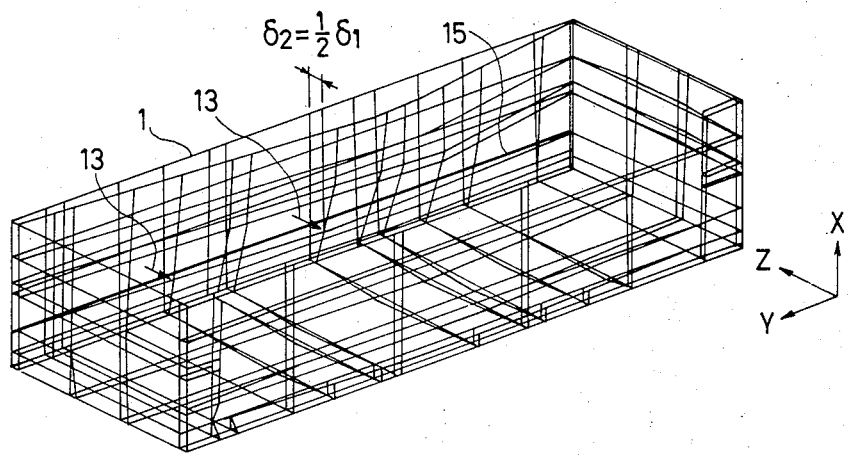
FIG. 15 is an analytical diagram showing bed deformation in the embodiment of FIG. 14.

In the embodiment shown in FIG. 14, reinforcing ribs 15 are provided under each of the saddle guide rails 3, extending parallel thereto. In this case, as indicated by the analytical diagram of FIG. 15, experimental results have proven that the amount of deformation $\delta_2$ for beds of similar dimensions and equal loads for the case of the embodiment of FIG. 14 is about half the amount of deformation $\delta_1$ in the conventional structure.

Figure 16:
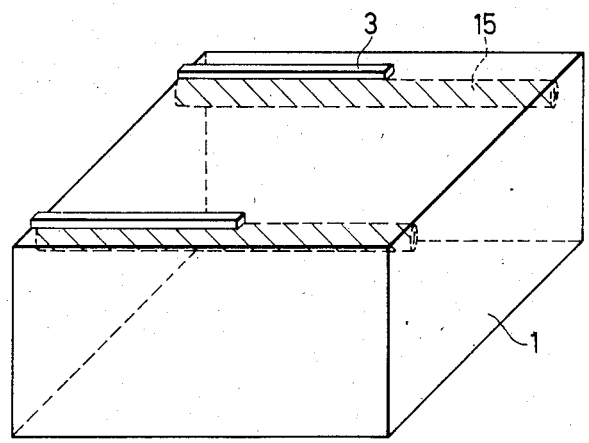
FIG. 16 is a diagram showing the arrangement of the reinforcing member of yet another embodiment of the invention.

FIG. 16 shows a modification of the FIG. 14 embodiment whereby the reinforcing ribs 15 take the form of tubular members. The same effects as in the case of FIG. 14 are attained. Of course, as in the embodiments mentioned above, it suffices if there is some small amount of offset between the saddle guide rails 3 and the respective ones of the reinforcing ribs 15.

This completes the description of the preferred embodiments of the invention. Although preferred embodiments have been described, it is believed that numerous modifications and alterations thereto would be apparent to one of ordinary skill in the art without departing from the spirit or scope of the invention.

What is claimed is:

1. An electrical discharge machining apparatus, comprising: a bed constituted by a pair of opposed side plates and an upper plate, a machining head supported above said bed by a column, a pair of saddle guide rails disposed on said upper plate, and a saddle for supporting a workpiece, said saddle being movably mounted on said saddle guide rails, said saddle guide rails being disposed at edges of said upper plate, and substantially directly above and extending parallel to upper end surfaces of respective ones of said side plates, and being substantially flush with said side plates; table guide rails disposed on said saddle and extending perpendicular to said saddle guide rails, and a table receiving said workpiece movably mounted on said table guide rails.

2. The electrical discharge machining apparatus according to claim 1, wherein said machining head comprises an electrical discharge machining electrode for machining said workpiece.

3. The electrical discharge machining apparatus according to claim 1, wherein said saddle guide rails are parallel to one another.

4. The electrical discharge machining apparatus according to claim 3, wherein each of said saddle guide rails is linear.

5. The electrical discharge machining apparatus according to claim 1, wherein said bed has a generally box-like shape having a valley portion at a center of said upper plate.

6. The electrical discharge machining apparatus according to claim 5, wherein said saddle guide rails are disposed at opposite edges of said upper plate at edges thereof adjacent said valley portion.

7. The electrical discharge machining apparatus according to claim 1, wherein said bed has generally a box-like shape.

8. The electrical discharge machining apparatus according to claim 1, wherein said bed has generally a box-like shape and said upper plate forms a pedestal in an upper surface of said bed.

9. An electric discharge machining apparatus, comprising: a bed constituted by a pair of opposed side plates and an upper plate, a machining head supported above said bed by a column, a pair of saddle guide rails disposed on said upper plate, a saddle for supporting a workpiece movably mounted on said saddle guide rails, and reinforcing members provided under said upper plate and extending parallel to and directly under respective ones of said saddle guide rails, said reinforcing members extending vertically from said upper plate to a supporting surface of said bed, and each including at least one plate like member extending vertically from said upper plate to said supporting surface.

10. The electrical discharge machining apparatus according to claim 9, wherein each of said reinforcing members comprises a plurality of reinforcing ribs extending from said upper plate to a supporting surface of said bed.

11. The electrical discharge machining apparatus according to claim 9, wherein each of said reinforcing members comprises a truss structure including a frame member extending from said upper plate to a supporting surface of said bed and bracing members diagonally connecting corners of said frame member.

12. The electrical discharge machining apparatus according to claim 9, wherein each of said reinforcing members comprises upper and lower longitudinal members under said upper plate and resting on a supporting surface of said bed, respectively, a central vertical member extending between central portions of said longitudinal members, and diagonal members extending between a juncture of said vertical member and said lower longitudinal member and ends of said upper longitudinal member.

13. The electrical discharge machining apparatus of according to claim 9, wherein each of said reinforcing members comprises an upper member directly beneath a respective one of said saddle guide rails, a lower member parallel to said upper member and disposed on a supporting surface of said bed, and first and second longitudinal members extending diagonally between ends of said upper and lower members.

14. The electrical discharge machining apparatus according to claim 9, wherein each of said reinforcing members comprises a reinforcing rib fixed to said upper plate.

* * * * *